US010756338B2

(12) United States Patent
Lee et al.

(10) Patent No.: US 10,756,338 B2
(45) Date of Patent: Aug. 25, 2020

(54) CATHODE ACTIVE MATERIAL FOR SECONDARY BATTERY AND METHOD OF MANUFACTURING THE SAME

(71) Applicant: LG Chem, Ltd., Seoul (KR)

(72) Inventors: Dong Kwon Lee, Daejeon (KR); Seung Beom Cho, Daejeon (KR); Jun Seok Nho, Daejeon (KR); Wook Jang, Daejeon (KR)

(73) Assignee: LG Chem, Ltd. (KR)

( * ) Notice: Subject to any disclaimer, the term of this patent is extended or adjusted under 35 U.S.C. 154(b) by 934 days.

(21) Appl. No.: 14/420,427

(22) PCT Filed: Sep. 30, 2014

(86) PCT No.: PCT/KR2014/009192
§ 371 (c)(1),
(2) Date: Feb. 9, 2015

(87) PCT Pub. No.: WO2015/047023
PCT Pub. Date: Apr. 2, 2015

(65) Prior Publication Data
US 2016/0028076 A1 Jan. 28, 2016

(30) Foreign Application Priority Data

Sep. 30, 2013 (KR) .................. 10-2013-0117035
Sep. 29, 2014 (KR) .................. 10-2014-0130376

(51) Int. Cl.
*H01M 4/04* (2006.01)
*H01M 4/36* (2006.01)
(Continued)

(52) U.S. Cl.
CPC .......... *H01M 4/366* (2013.01); *C01G 31/006* (2013.01); *C01G 37/006* (2013.01);
(Continued)

(58) Field of Classification Search
CPC .... H01M 4/366; H01M 4/0471; H01M 4/131; H01M 4/1391; H01M 4/525;
(Continued)

(56) References Cited

U.S. PATENT DOCUMENTS 6,110,442 A 8/2000 Xia et al.
2004/0258986 A1 12/2004 Shen et al.
(Continued)

FOREIGN PATENT DOCUMENTS

CN  1627550 A   6/2005
CN  101308925 A  11/2008
(Continued)

OTHER PUBLICATIONS

Liu, W., et al. "Synthesis and electrochemical studies of spinel phase LiMn2 O 4 cathode materials prepared by the Pechini process." Journal of the Electrochemical Society 143.3 (1996): 879-884.*
(Continued)

*Primary Examiner* — Cynthia K Walls
(74) *Attorney, Agent, or Firm* — Lerner, David, Littenberg, Krumholz & Mentlik, LLP

(57) ABSTRACT

Provided are a method of manufacturing a cathode active material including a first step of preparing a metal glycolate solution, a second step of mixing lithium-containing transition metal oxide particles and the metal glycolate solution and stirring in a paste state, a third step of drying the paste-state mixture, and a fourth step of performing a heat treatment on the dried mixture, a cathode active material including a metal oxide layer which is manufactured by the above method, and a secondary battery composed of a cathode including the cathode active material.

18 Claims, 1 Drawing Sheet

(51) Int. Cl.

| | | |
|---|---|---|
| C01G 31/00 | (2006.01) | |
| C01G 53/00 | (2006.01) | |
| C01G 51/00 | (2006.01) | |
| C01G 37/00 | (2006.01) | |
| H01M 4/1391 | (2010.01) | |
| C01G 45/12 | (2006.01) | |
| H01M 4/131 | (2010.01) | |
| H01M 4/525 | (2010.01) | |
| H01M 10/052 | (2010.01) | |
| H01M 4/505 | (2010.01) | |
| H01M 4/58 | (2010.01) | |
| H01M 4/62 | (2006.01) | |

(52) U.S. Cl.
CPC ..... *C01G 45/1228* (2013.01); *C01G 45/1242* (2013.01); *C01G 51/42* (2013.01); *C01G 51/50* (2013.01); *C01G 51/52* (2013.01); *C01G 53/42* (2013.01); *C01G 53/50* (2013.01); *H01M 4/0471* (2013.01); *H01M 4/131* (2013.01); *H01M 4/1391* (2013.01); *H01M 4/525* (2013.01); *C01P 2006/40* (2013.01); *H01M 4/505* (2013.01); *H01M 4/5825* (2013.01); *H01M 4/62* (2013.01); *H01M 10/052* (2013.01)

(58) Field of Classification Search
CPC ...... H01M 4/505; H01M 4/5825; H01M 4/62; H01M 10/052; C01G 31/006; C01G 37/006; C01G 45/1228; C01G 45/1242; C01G 51/42; C01G 51/50; C01G 51/52; C01G 53/42; C01G 53/50; C01P 2006/40
See application file for complete search history.

(56) References Cited

U.S. PATENT DOCUMENTS

| | | | |
|---|---|---|---|
| 2005/0175899 A1 | 8/2005 | Noda et al. | |
| 2007/0122338 A1 | 5/2007 | Park et al. | |
| 2008/0113269 A1* | 5/2008 | Yamamoto | C01G 45/1221 429/231.4 |
| 2009/0004563 A1 | 1/2009 | Zhong | |
| 2009/0253042 A1 | 10/2009 | Sun et al. | |
| 2010/0233541 A1 | 9/2010 | Sano | |
| 2011/0108760 A1 | 5/2011 | Mukainakano et al. | |
| 2011/0226985 A1 | 9/2011 | Park et al. | |
| 2011/0274973 A1 | 11/2011 | Sheem et al. | |
| 2012/0326078 A1 | 12/2012 | Chung et al. | |
| 2013/0149227 A1 | 6/2013 | Chon et al. | |
| 2013/0149616 A1 | 6/2013 | Lee et al. | |
| 2013/0224570 A1* | 8/2013 | Sasaki | H01M 4/133 429/163 |
| 2013/0236788 A1 | 9/2013 | Tsunozaki et al. | |
| 2014/0272583 A1 | 9/2014 | Hellring et al. | |
| 2014/0308576 A1 | 10/2014 | Gaben et al. | |
| 2014/0339085 A1 | 11/2014 | Bouyer et al. | |
| 2015/0104713 A1 | 4/2015 | Gaben et al. | |

FOREIGN PATENT DOCUMENTS

| | | | |
|---|---|---|---|
| CN | 101510606 A | | 8/2009 |
| CN | 101515644 A | | 8/2009 |
| CN | 102185141 A | | 9/2011 |
| CN | 102195034 A | | 9/2011 |
| CN | 102237523 A | | 11/2011 |
| CN | 102931384 A | | 2/2013 |
| CN | 102969497 A | * | 3/2013 |
| CN | 103107337 A | | 5/2013 |
| EP | 2096692 A1 | | 9/2009 |
| JP | 2003500318 A | | 1/2003 |
| JP | 2007039266 A | | 2/2007 |
| JP | 2007242318 A | | 9/2007 |
| JP | 2010102895 A | * | 5/2010 |
| JP | 2010218838 A | | 9/2010 |
| JP | 2013093167 A | | 5/2013 |
| JP | 2013107815 A | | 6/2013 |
| JP | 2013191516 A | | 9/2013 |
| JP | 2013539167 A | | 10/2013 |
| KR | 19990073753 A | | 10/1999 |
| KR | 100366058 A | | 4/2001 |
| KR | 20010029695 A | | 4/2001 |
| KR | 100813014 B1 | | 3/2008 |
| KR | 20080099131 A | | 11/2008 |
| KR | 20090093165 A | | 9/2009 |
| KR | 20110017253 A | | 2/2011 |
| KR | 20120021674 A | | 3/2012 |
| KR | 101249055 B1 | | 3/2013 |
| TW | 567632 B | | 12/2003 |
| WO | 2009105773 A2 | | 8/2009 |
| WO | 2012057289 A1 | | 5/2012 |
| WO | 2013064773 A1 | | 5/2013 |
| WO | 2013064776 A1 | | 5/2013 |
| WO | 2013064779 A1 | | 5/2013 |
| WO | 2013064781 A1 | | 5/2013 |

OTHER PUBLICATIONS

Wang, Xiong, et al. "Citric acid-assisted sol-gel synthesis of nanocrystalline LiMn 2 O 4 spinel as cathode material." Journal of Crystal Growth 256.1 (2003): 123-127.*

Simner, Steven P., Pu-Wei Wu, and Bruce Dunn. "Solution processing approaches for solid electrolytes and electrode materials." Journal of materials research 13.4 (1998): 866-874. (Year: 1998).*

Chen, Jin-Ming, et al. "Electrochemical studies on LiCoO2 surface coated with Y3Al5O12 for lithium-ion cells." Journal of Power Sources 189.1 (2009): 279-287. (Year: 2009).*

English machine translation of Han et al. (CN 102969497 A) (Year: 2013).*

English machine translation of Sueki (JP 2010102895 A) (Year: 2010).*

Fey, George Ting-Kuo, et al. "Zirconia-coated lithium cobalt oxide as a long-cycling cathode for lithium batteries." Journal of the Chinese Institute of Engineers 28.7 (2005): 1139-1151. (Year: 2005).*

Office Action from Chinese Application No. 201480002134.5, dated Jun. 2, 2016.

International Search Report for Application No. PCT/KR2014/009194 dated Jan. 15, 2015.

Extended Search Report from European Application No. 14825240.5, dated Sep. 24, 2015.

Office Action from Chinese Application No. 201480002138.3, dated Jun. 24, 2016.

English Translation of KR20120021674.

English translation KR101249055.

Extended Search Report from European Application No. 14827995, dated Oct. 1, 2015.

Liu, et al., "Synthesis and Electrochemical Studies of Spinel Phase LiMn2O4, Cathode Materials Prepared by the Pechini Process." Journal of the Electrochemical Society, vol. 143, No. 3, Mar. 1, 1996, pp. 879-884, XP002032962.

Extended Search Report from European Application No. 14827702.3, dated Oct. 1, 2015.

International Search Report for Application No. PCT/KR2014/009192 dated Jan. 15, 2015.

International Search Report for Application No. PCT/KR2014/009195 dated Jan. 14, 2015.

Chinese Search Report from Application No. 201480021345, dated Aug. 30, 2017.

* cited by examiner

CATHODE ACTIVE MATERIAL FOR SECONDARY BATTERY AND METHOD OF MANUFACTURING THE SAME

CROSS-REFERENCE TO RELATED APPLICATION

This application is a national phase entry under 35 U.S.C. § 371 of International Application No. PCT/KR2014/009192, filed Sep. 30, 2014, which claims priority to Korean Patent Application No. 10-2013-0117035, filed on Sep. 30, 2013 and Korean Patent Application No. 10-2014-0130376, filed on Sep. 29, 2014, the disclosures of which are incorporated herein by reference.

TECHNICAL FIELD

The present invention relates to a cathode active material for a secondary battery and a method of manufacturing the same, and more particularly, to a cathode active material including a metal oxide layer having a uniform thickness which is formed by using a metal glycolate solution, and a method of manufacturing the cathode active material.

BACKGROUND ART

In line with the increasing use of mobile devices and vehicles, demand for secondary batteries as their energy sources has been rapidly increased. As the secondary batteries, lithium secondary batteries having high energy density, high voltage, long cycle life, and low self-discharging rate have been commercialized and widely used.

A lithium secondary battery may be largely composed of a cathode active material, an anode active material, a separator, and an electrolyte. Specifically, a carbon material has been used as a main component of the anode active material, and in addition, research into using lithium metal, a sulfur compound, a silicon compound, and a tin compound has been actively conducted. Also, a layered structure, lithium-containing cobalt oxide ($LiCoO_2$) has been mainly used as the cathode active material, and in addition, lithium metal compounds having a layered structure (the metal includes manganese, cobalt, nickel, etc.), lithium-containing manganese oxides having a spinel structure ($LiMnO_2$ and $LiMn_2O_4$), and lithium-containing nickel oxide ($LiNiO_2$) have been commercialized.

With respect to $LiCoO_2$ among the above cathode active materials, it has limitations in being applied to high-capacity batteries for electric vehicles due to the fact that it has low structural stability, has high raw material costs, and causes environmental pollution. With respect to a lithium manganese oxide, such as $LiMnO_2$ and $LiMn_2O_4$, studied as an alternative material of $LiCoO_2$, it is inexpensive, but has disadvantages in that electrical conductivity is low, capacity is low, and electrode degradation rapidly occurs at high temperature. Also, with respect to the lithium-containing nickel oxide, it has battery characteristics of high discharge capacity, but has disadvantages in that it is difficult to be synthesized by a simple solid-state reaction and its cycle characteristics are low.

Therefore, there is an urgent need to develop a novel cathode active material having excellent high-temperature stability, lower manufacturing costs, and excellent cycle characteristics.

DISCLOSURE OF THE INVENTION

Technical Problem

An aspect of the present invention provides a method of manufacturing a cathode active material which includes a metal oxide coating layer formed by using a metal glycolate solution.

Another aspect of the present invention provides a cathode active material coated with a metal oxide layer which is manufactured by the above method.

Another aspect of the present invention provides a secondary battery in which cycle characteristics are improved by including the cathode active material coated with a metal oxide layer.

Technical Solution

According to an aspect of the present invention, there is provided a method of manufacturing a cathode active material coated with a metal oxide layer including the steps of: a first step of preparing a metal glycolate solution; a second step of mixing lithium-containing transition metal oxide particles and the metal glycolate solution and stirring in a paste state; a third step of drying the paste-state mixture; and a fourth step of performing a heat treatment on the dried mixture.

In particular, in the present invention, the metal glycolate solution may be prepared by a method which includes preparing a mixed solution by dispersing a metal precursor and a chelating agent in a glycol-based solvent; performing primary heating on the mixed solution; and performing secondary heating on the mixed solution.

According to another aspect of the present invention, there is provided a cathode active material, which is manufactured by the above method, including: lithium-containing transition metal oxide particles; and a metal oxide layer coated on surfaces of the lithium-containing transition metal oxide particles.

According to another aspect of the present invention, there is provided a cathode for a secondary battery including: a cathode collector; and the cathode active material of the present invention coated on the cathode collector.

According to another aspect of the present invention, there is provided a lithium secondary battery including: the cathode of the present invention; an anode; a separator disposed between the cathode and the anode; and a lithium salt-containing non-aqueous electrolyte solution.

Advantageous Effects

In the present invention, a metal oxide layer having a uniform thickness may be formed on the surface of a cathode active material by using a metal glycolate solution. Also, a cathode having improved charge and discharge efficiency and a secondary battery having improved cycle characteristics may be prepared by including the cathode active material coated with a metal oxide.

MODE FOR CARRYING OUT THE INVENTION

Figure 1:
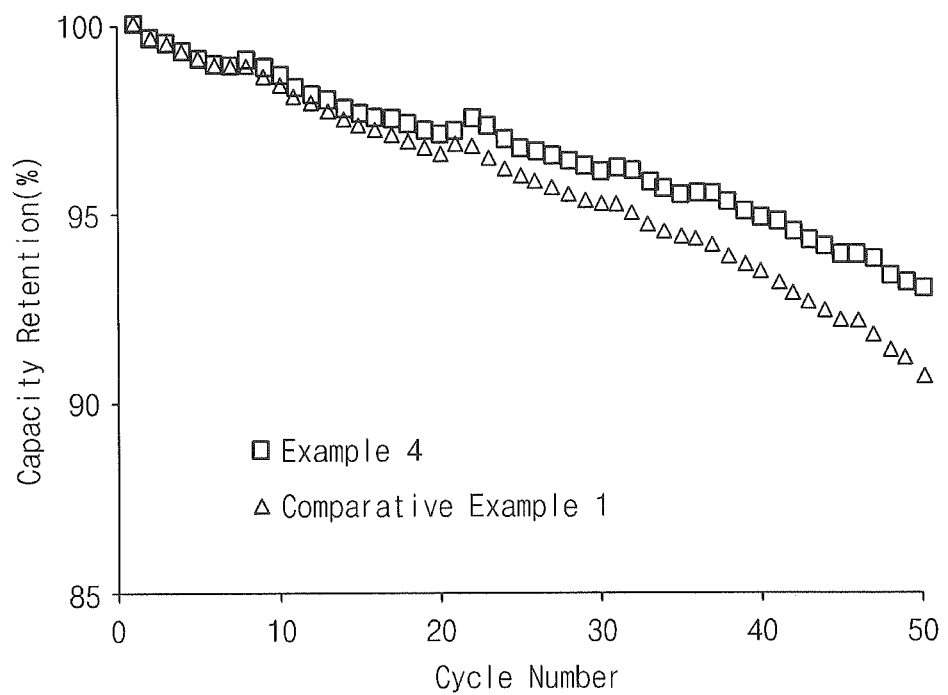
FIG. 1 is a graph comparing cycle characteristics of secondary batteries according to Experimental Example 1 of the present invention.

Hereinafter, the present invention will be described in detail.

Recently, the need for using a cathode of a lithium ion secondary battery at a high voltage increases, and accordingly, research into methods for preparing a cathode active material having excellent high-temperature stability, low manufacturing costs, excellent capacity, and excellent cycle characteristics has emerged. For example, in order to improve thermal stability and cycle characteristics, a method of coating the surface of a cathode active material with a metal oxide using a typical dry or wet coating method has been proposed. However, since it is difficult to coat the metal oxide to have a uniform thickness by the typical method, the degree of improvement is still insufficient. For example, the dry coating method has advantages in that the process is simple and cost is low, but has disadvantages in that it is difficult to form a metal oxide coating layer having a uniform thickness on the surface of a cathode active material. The wet coating method may form a metal oxide coating layer having a uniform thickness. However, the wet coating method has disadvantages in that anions capable of degrading battery characteristics may not only remain on the surface of the metal oxide coating layer, but it may also be difficult to coat a metal oxide layer having a uniform thickness to further improve charge and discharge efficiency.

Accordingly, the present invention aims at providing a method of manufacturing a cathode active material for a secondary battery which may form a metal oxide coating layer to have a uniform thickness, a cathode active material coated with a metal oxide which is manufactured by the above method, and a secondary battery including the cathode active material.

Specifically, according to an embodiment of the present invention, provided is a method of manufacturing a cathode active material coated with a metal oxide layer including the steps of:

a first step of preparing a metal glycolate solution;

a second step of mixing lithium-containing transition metal oxide particles and the metal glycolate solution and stirring in a paste state;

a third step of drying the paste-state mixture; and a fourth step of performing a heat treatment on the dried mixture.

First, in the method of the present invention, the first step of preparing a metal glycolate solution may include preparing a mixed solution by dispersing a metal precursor and a chelating agent in a glycol-based solvent; performing primary heating on the mixed solution; and performing secondary heating on the mixed solution.

During the preparation of the metal glycolate solution (the first step), the glycol-based solvent is a component added to function as a reactant which forms a metal organo-compound by combining (reacting) with a metal desorbed from the metal precursor during a heating process. Typical examples of the glycol-based solvent may include solvents having a boiling point (bp) of 120° C. to 400° C., for example, a single material selected from the group consisting of ethylene glycol (bp 197° C.), propylene glycol (bp 188° C.), diethylene glycol (bp 245° C.), triethylene glycol (bp 285° C.), and polyethylene glycol, or a mixture of two or more thereof, but the present invention is not particularly limited thereto. In the case that a solvent having a boiling point of less than 120° C. is used as the glycol-based solvent, since the binding reaction with the metal desorbed from the metal precursor does not occur, the metal organo-compound may be difficult to be formed.

Also, during the preparation of the metal glycolate solution (the first step), the metal precursor is not particularly limited so long as it includes a typical metal, and for example, the metal precursor may include a single material selected form the group consisting of acetate, hydroxide, nitrate, nitride, sulfate, sulfide, alkoxide, and halide, which include at least one metal selected form the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), and cerium (Ce), or a mixture of two or more thereof. Specifically, typical examples of the metal precursor may be aluminum acetate, zirconium nitride, or manganese acetate.

Furthermore, during the preparation of the metal glycolate solution (the first step), the chelating agent is a component added to facilitate the binding between the glycol-based solvent and the metal by more easily desorbing the metal from the metal precursor, and typical examples of the chelating agent may include a single material selected from the group consisting of citric acid, ethylenediaminetetraacetic acid (EDTA), oxalic acid, and gluconic acid, or a mixture of two or more thereof.

During the preparation of the metal glycolate solution, a content ratio (parts by weight) of the metal precursor:the glycol-based solvent:the chelating agent may be in a range of 1:1:0.1 to 1:500:20, for example, 1:1:0.1 to 1:100:20.

In the case that the amount of the glycol-based solvent is less than 1 part by weight, the metal desorbed from the metal precursor may not entirely react with the glycol-based solvent to remain in a state of the metal precursor. Also, in the case in which the amount of the glycol-based solvent is greater than 500 parts by weight, since a large amount of the unnecessary glycol-based solvent must be removed by being evaporated during the secondary heating reaction, the consumption of energy and the glycol-based solvent may be large. Furthermore, in the case that the amount of the chelating agent is less than 0.1 parts by weight, the effect of the chelating agent may not be sufficiently obtained. In the case in which the amount of the chelating agent is greater than 20 parts by weight, since a large amount of the chelating agent preferentially reacts with the metal precursor to inhibit the reaction between the glycol-based solvent and the metal precursor, a desired yield of the metal organo-compound may be reduced.

During the preparation of the metal glycolate solution (the first step), an additive may be further included. The additive may improve the yield of metal oxide by being included as a catalyst component which promotes the reaction between the metal desorbed from the metal precursor and the glycol-based solvent. The additive may be a component which does not remain later in a coating layer by being entirely evaporated and removed during the heating. Typical examples of the additive may include a single material selected from the group consisting of formaldehyde, acetaldehyde, and glycolic acid, or a mixture of two or more thereof.

The additive may be included in an amount of 0.1 parts by weight to 20 parts by weight based on total 1 part by weight of the metal precursor. In the case that the amount of the additive is greater than 20 parts by weight, there may be a possibility that a large amount of byproducts may be formed due to the occurrence of side reactions.

Also, during the preparation of the metal glycolate solution (the first step), the primary heating may be performed at a temperature below a boiling point of the glycol-based solvent, as a temperature at which the reaction is initiated, to a temperature above the boiling point. Specifically, the primary heating may be performed in a temperature range of 100° C. to 300° C., for example, 110° C. to 230° C., for 1 hour to 48 hours, for example, 5 hours to 20 hours. The primary heating may be performed in which a time at which all metal of the metal precursor react with the glycol-based solvent to form the metal organo-compound is set as a termination point.

A viscosity of the mixed solution after the primary heating may be in a range of about 1 cps (centipoise) to about 1,000 cps, and specifically, the mixed solution may have a viscosity similar to the glycol-based solvent.

Furthermore, during the preparation of the metal glycolate solution (the first step), the secondary heating may be immediately performed with no time interval, such as a cooling process, after the primary heating. In this case, the secondary heating may be performed at a temperature near the boiling point of the glycol-based solvent or thereabove. Specifically, the secondary heating may be performed in a temperature range of 100° C. to 300° C., for example, 170° C. to 250° C., for 1 hour to 5 hours. For example, in the case that ethylene glycol is used as the glycol-based solvent, the secondary heating may be performed at a temperature of about 180° C. or more for 1 hour to 5 hours.

The secondary heating may be performed until a termination point at which the glycol-based solvent used as a reactant is sufficiently removed to form a metal glycolate solution. Thus, the secondary heating may be referred to as "heating and concentrating". In this case, the metal glycolate solution may have a viscosity of 1 cps to 15,000 cps, specifically, 200 cps to 5,000 cps, for example, 1,000 cps to 3,000 cps.

During the preparation of the metal glycolate solution (the first step), the primary heating and the secondary heating may be performed in an inert gas atmosphere such as argon (Ar).

In the case that the metal glycolate solution is prepared by the performing of the secondary heating, a concentration of the coating solution may be easily adjusted during the preparation of the cathode active material including the metal coating layer, and thus, the effectiveness of coating may be improved by controlling coating conditions according to the concentration of the coating solution.

In the present invention, a glycol-based solvent (e.g., ethylene glycol), a metal precursor, and a chelating agent (e.g., citric acid) are mixed to prepare a mixed solution, and coordination bonds are then formed between oxygen of the glycol-based solvent and the chelating agent and metal ions desorbed from the metal precursor as follow while hydrogen of the glycol-based solvent and the chelating agent is desorbed during heating (concentrating) the mixed solution. As a result, a metal glycolate coating solution including a metal organo-compound as a main component is obtained while a metal desorbed from the metal precursor, the glycol-based solvent, and the chelating agent are combined together.

Typical examples of the metal glycolate solution prepared by the above method may include a single material selected from the group consisting of aluminum glycolate, zirconium glycolate, titanium glycolate, calcium glycolate, and manganese glycolate, or a mixture of two or more thereof.

Also, in the method of manufacturing a cathode active material of the present invention, the lithium-containing transition metal oxide (the second step) is not particularly limited so long as it is a typical lithium-containing transition metal oxide for a cathode active material, and for example, may include one selected from the group consisting of $LiMO_2$ (M=Co, Mn, Ni, $Ni_{1/3}Co_{1/3}Mn_{1/3}$, Cr, or V), $LiMO_4$ (M=CoMn, NiV, CoV, CoP, FeP, MnP, NiP, or $Mn_2$), $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0≤y≤1), $Li(Ni_aMn_bCo_c)O_4$ (0<a<2, 0<b<2, 0<c<2, a+b+c=2), $LiMn_{2-z}Ni_zO_4$, $LiMn_{2-z}Co_zO_4$ (0<z<2), and $LiV_3O_6$.

Specifically, typical examples of the lithium-containing transition metal oxide may be $LiCoO_2$, $LiNiO_2$, $LiMnO_2$, $LiCuO_2$, $LiMn_2O_4$, $LiNi_{1/3}Mn_{1/3}Co_{1/3}O_2$, $LiCoPO_4$, or $LiFePO_4$.

Also, in the method of manufacturing a cathode active material of the present invention, the mixing of the lithium-containing transition metal oxide particles and the metal glycolate solution and the stirring in a paste state (the second step) may be performed at a revolution speed of 500 rpm to 2,000 rpm and a rotation speed of 500 rpm to 2,000 rpm, specifically, at a revolution speed of 1,500 rpm and a rotation speed of 1,500 rpm using a paste mixer.

Furthermore, the drying of the paste-state mixture (the third step), as a step performed for evaporating a solvent in the paste-state mixture, may be performed in a temperature range of 100° C. to 200° C., specifically, at a temperature of 180° C. for 1 hour to 4 hours, for example, 2 hours.

Subsequently, in the method of manufacturing a cathode active material of the present invention, the heat treatment (the fourth step) may be performed in a temperature range of about 200° C. to about 1,200° C., specifically, 300° C. to 800° C., for 1 hour to 24 hours, for example, 1 hour to 10 hours in an air (oxidation) atmosphere.

In the case that the heat treatment temperature is greater than 1,200° C., a phenomenon may occur in which oxygen present in the lithium-containing transition metal oxide constituting the cathode active material is desorbed in a gaseous form, and in the case in which the heat treatment temperature is equal to or less than 200° C., a uniform metal oxide coating layer may not be formed.

After the performing of the heat treatment (the fourth step), a metal oxide layer derived from the metal glycolate solution is formed to a uniform thickness on the surface of the lithium-containing transition metal oxide. That is, an oxide layer of the same metal may be formed on the surface of the cathode active material according to the type of the metal glycolate solution. The metal oxide layer coated on the surface of the cathode active material after the heat treatment (the fourth step) may include an oxide layer of at least one metal selected from the group consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce.

As described above, in the method of the present invention, the metal glycolate solution and the lithium-containing transition metal oxide particles are mixed in a paste state and then heat-treated. Thus, the surface of the lithium-containing transition metal oxide, for example, the surface of the cathode active material, of the secondary battery may be coated with a metal oxide layer having a uniform thickness. Furthermore, since a uniform carbon coating layer may be further formed on the surface of the cathode active material without additional supply of a carbon source as a subsequent process, a cathode active material having improved thermal stability, capacity characteristics, and cycle characteristics and a secondary battery including the cathode active material may be manufactured.

That is, since the metal oxide layer may act as an electrical resistance layer exhibiting significant internal resistance during high-rate discharge, such as a short circuit during the operation of the secondary battery, to obstruct the introduction of electrons into a lithium-containing transition metal oxide core, the metal oxide layer may also suppress the intercalation of lithium ions. That is, since the metal oxide layer may decrease the rate at which a large amount of lithium ions and electrons released from an anode during internal short circuit is intercalated into the cathode active material, the metal oxide layer may prevent the generation of heat due to the generation of instantaneous overcurrent and may improve the stability of the battery. If only a portion of the surface of the lithium-containing transition metal oxide is coated with the metal oxide, lithium ions and electrons may be intercalated into the lithium-containing transition metal oxide through a portion which is not coated with the metal oxide. Thus, the above-described effect, such as the decrease in the movement speed of lithium ions and electrons, may not be obtained, but an area through which lithium ions and electrons pass may also be decreased to further increase the local movement speed of the lithium ions and electrons due to a nozzle effect. Thus, the metal oxide layer may adversely affect the stability of the battery by promoting the local generation of heat. However, according to the present invention, since the surface of the lithium-containing transition metal oxide is uniformly coated with a metal oxide, the flow of lithium ions may be suppressed by maximizing the action of the metal oxide layer as a resistor when the overcurrent flows. In particular, the cathode active material of the present invention including the lithium-containing transition metal oxide coated with a metal oxide may decrease the surface energy of the lithium-containing transition metal oxide to change into a stable state, and thus, thermal stability may be improved by suppressing side reactions between the lithium-containing transition metal oxide and an electrolyte solution.

Also, according to an embodiment of the present invention, provided is a cathode active material, which is manufactured by the above method, including lithium-containing transition metal oxide particles and a metal oxide layer coated on surfaces of the lithium-containing transition metal oxide particles.

In this case, the metal oxide layer may include at least one compound selected from the group consisting of compounds represented by the following Chemical Formulae 1 to 3 in which a metal desorbed from a metal precursor, a glycol-based solvent, and a chelating agent are combined.

$$M(C_2H_5O_2)_n \qquad \text{[Chemical Formula 1]}$$

$$M(C_6H_{(8-n)}O_7) \qquad \text{[Chemical Formula 2]}$$

$$M(C_6H_{(8-n)}O_7)(C_2H_5O_2) \qquad \text{[Chemical Formula 3]}$$

(where, M, as the metal desorbed from the metal precursor, represents at least one metal selected from the group consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce, and n is an integer between 1 and 4.)

A thickness of the metal oxide layer may be in a range of 5 nm to 500 nm. In the case that the thickness of the metal oxide layer is less than 5 nm, an effect of protecting a cathode material may be reduced. In the case in which the thickness of the metal oxide layer is greater than 500 nm, since the metal oxide layer may obstruct lithium-ion movement, battery capacity and output may be reduced.

Also, an amount of metal in the metal oxide layer may be in a range of 0.01 wt % to 10 wt % based on a total weight of the lithium-containing transition metal oxide. In the case that the amount of the metal in the metal oxide layer is less than 0.01 wt %, the protective effect due to the coating may be reduced. In the case in which the amount of the metal in the metal oxide layer is greater than 10 wt %, since an excessive amount of the metal is coated, the metal oxide layer may adversely affect the capacity and output of the battery.

It may be desirable for the metal oxide layer to be in the form of being coated on the surface of the cathode active material. However, the metal oxide layer may also be formed to have a concentration gradient from the center of the cathode active material particle to the outer surface thereof because the inside of the cathode active material particle may be doped with the metal.

Also, the present invention provides a cathode for a secondary battery including a cathode collector and the cathode active material of the present invention coated on the cathode collector.

In this case, the cathode collector is generally fabricated to have a thickness of about 3 μm to about 500 μm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like.

Also, the cathode active material may further include a binder and a conductive agent in addition to the cathode active material coated with a metal oxide layer of the present invention.

The binder is a component that assists in the binding between the active material and the conductive agent and in the binding with the collector. The binder is commonly added in an amount of 1 wt % to 30 wt % based on a total weight of a mixture including the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene butadiene rubber, a fluoro rubber, various copolymers, and the like.

Also, the conductive agent is commonly added in an amount of 1 wt % to 30 wt % based on the total weight of the mixture including the cathode active material. Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

Also, according to an embodiment of the present invention, a lithium secondary battery composed of the cathode including the cathode active material, an anode, a separator, and a lithium salt-containing non-aqueous electrolyte solution is provided.

The anode, for example, is prepared by coating an anode collector with an anode material including an anode active material and then drying the anode collector. If necessary, components, such as the conductive agent, the binder, and a filler, may be included in the anode material.

The anode collector is generally fabricated to have a thickness of about 3 μm to about 500 μm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, a foil, a net, a porous body, a foam body, a non-woven fabric body, and the like.

The separator is disposed between the cathode and the anode, and a thin insulating film having high ion permeability and mechanical strength is used. The separator typically has a pore diameter of 0.01 μm to 10 μm and a thickness of 5 μm to 300 μm.

For example, sheets or non-woven fabrics formed of an olefin-based polymer such as polypropylene; glass fibers or polyethylene, which have chemical resistance and hydrophobicity, are used as the separator. When a solid electrolyte, such as a polymer, is used as an electrolyte, the solid electrolyte may also serve as the separator.

The lithium salt-containing non-aqueous electrolyte solution is formed of an electrolyte and a lithium salt, and a non-aqueous organic solvent or an organic solid electrolyte may be used as the electrolyte solution.

Examples of the non-aqueous organic solvent may include aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

The lithium salt is a material that is readily soluble in the non-aqueous electrolyte and for example, may include LiCl, LiBr, LiI, $LiClO_4$, $LiBF_4$, $LiB_{10}Cl_{11}$, $BiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the electrolyte solution. In some cases, halogen-containing solvents, such as carbon tetrachloride and ethylene trifluoride, may be further included in order to impart incombustibility, and carbon dioxide gas may be further included in order to improve high-temperature storage characteristics.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Preparation Example 1. Preparation of Metal Glycolate Solution 40 g of zirconium nitride (ZrN) and 10 g of citric acid ($C_6H_8O_7$) were dispersed in 200 g of an ethylene glycol ($C_2H_6O_2$) solution and then stirred to prepare a mixed solution. The mixed solution was heated with stirring at a temperature of 150° C. for 5 hours, and then heated and concentrated at a temperature of 180° C. for 1 hour to prepare a zirconium glycolate solution.

Preparation Example 2. Preparation of Metal Glycolate Solution 30 g of titanium isopropoxide ($Ti(OCH(CH_3)_2)_4$) and 10 g of citric acid ($C_6H_8O_7$) were dispersed in 200 g of an ethylene glycol ($C_2H_6O_2$) solution and then stirred to prepare a mixed solution. The mixed solution was heated with stirring at a temperature of 150° C. for 5 hours, and then heated and concentrated at a temperature of 180° C. for 1 hour to prepare a titanium glycolate solution.

Preparation Example 3. Preparation of Metal Glycolate Solution 20 g of aluminum acetate ($Al(C_2H_3O_2)_3$) and 20 g of citric acid ($C_6H_8O_7$) were dispersed in 200 g of an ethylene glycol ($C_2H_6O_2$) solution and then stirred to prepare a mixed solution. The mixed solution was heated with stirring at a temperature of 150° C. for 5 hours, and then heated and concentrated at a temperature of 180° C. for 1 hour to prepare an aluminum glycolate solution.

Example 1. Preparation of Cathode Active Material

While adding 2 g of the zirconium glycolate solution of Preparation Example 1 to 8 g of ethanol and stirring, $LiNi_{0.6}Mn_{0.2}Co_{0.2}O_2$ was added thereto and stirred in a paste state. The stirred paste was dried at 180° C. for 2 hours and then heat-treated at 800° C. in air for 1 hour to prepare cathode active material particles coated with about 0.2 wt % of zirconium oxide.

Example 2. Preparation of Cathode Active Material

While adding 2 g of the titanium glycolate solution of Preparation Example 2 to 8 g of ethanol and stirring, $LiNi_{0.6}Mn_{0.2}Co_{0.2}O_2$ was added thereto and stirred in a paste state. The stirred paste was dried at 180° C. for 2 hours and then heat-treated at 800° C. in air for 1 hour to prepare cathode active material particles coated with about 0.2 wt % of titanium oxide.

Example 3. Preparation of Cathode Active Material

While adding 1 g of the aluminum glycolate solution of Preparation Example 3 to 8 g of ethanol and stirring, LiNi$_{0.6}$Mn$_{0.2}$Co$_{0.2}$O$_2$ was added thereto and stirred in a paste state. The stirred paste was dried at 180° C. for 2 hours and then heat-treated at 800° C. in air for 1 hour to prepare cathode active material particles coated with about 0.2 wt % of aluminum oxide.

Example 4. Preparation of Secondary Battery

A slurry was prepared by adding 90 wt % of the cathode active material particles of Example 3, 6 wt % of carbon black as a conductive agent, and 4 wt % of polyvinylidene fluoride (PVDF) as a binder to N-methyl-pyrrolidone (NMP). An aluminum (Al) foil as a cathode collector was coated with the slurry, and the coated Al foil was then rolled and dried to prepare a cathode for a lithium secondary battery.

A porous polyethylene separator was disposed between the cathode and a graphite-based anode, and a lithium salt-containing electrolyte solution was injected to prepare a cell.

Comparative Example 1

A slurry was prepared by adding 90 wt % of LiNi$_{0.6}$Mn$_{0.2}$Co$_{0.2}$O$_2$ as a cathode active material, 6 wt % of carbon black as a conductive agent, and 4 wt % of PVDF as a binder to NMP. An Al foil as a cathode collector was coated with the slurry, and the coated Al foil was then rolled and dried to prepare a cathode for a lithium secondary battery in which a metal coating layer was not formed.

A porous polyethylene separator was disposed between the cathode and a graphite-based anode, and a lithium salt-containing secondary battery cell.

Experimental Example 1. Cycle Life Characteristics Measurement

Cycle life characteristics of the secondary battery of Example 4 and the secondary battery of Comparative Example 1 were measured. Referring to FIG. 1, it may be confirmed that cycle life of the secondary battery of Example 4 including the cathode of Example 3 was improved in comparison to that of the secondary battery of Comparative Example 1.

The invention claimed is:

1. A method of manufacturing a cathode active material, the method comprising steps of:
a first step of preparing a metal glycolate solution comprising preparing a mixed solution by dispersing a metal precursor and a chelating agent in a glycol-based solvent, and performing primary heating on the mixed solution at a temperature within a range of 100° C. to 300° C., and then performing secondary heating on the mixed solution;
a second step of mixing lithium-containing transition metal oxide particles and the metal glycolate solution and stirring in a paste state;
a third step of drying the paste-state mixture; and
a fourth step of forming a coating layer including metal oxide on the surface of the lithium-containing transition metal oxide particles by performing a heat treatment on the dried mixture,
wherein a content ratio (parts by weight) of the metal precursor:the glycol-based solvent:the chelating agent is in a range of 1:1:0.1 to 1:500:20.

2. The method of claim 1, wherein the glycol-based solvent comprises a single material selected from the group consisting of ethylene glycol, propylene glycol, diethylene glycol, triethylene glycol, and polyethylene glycol, or a mixture of two or more thereof.

3. The method of claim 1, wherein the metal precursor comprises a single material selected from the group consisting of acetate, hydroxide, nitrate, nitride, sulfate, sulfide, alkoxide, and halide, which includes at least one metal selected from the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Jr), nickel (Ni), zinc (Zn), aluminum (Al), gallium (Ga), indium (In), silicon (Si), germanium (Ge), tin (Sn), lanthanum (La), and cerium (Ce), or a mixture of two or more thereof.

4. The method of claim 1, wherein the chelating agent comprises a single material selected from the group consisting of citric acid, ethylenediaminetetraacetic acid (EDTA), oxalic acid, and gluconic acid, or a mixture of two or more thereof.

5. The method of claim 1, wherein the primary heating is performed in a temperature range of 150° C. to 300° C. for 1 hour to 48 hours.

6. The method of claim 1, wherein the secondary heating is performed in a temperature range of 150° C. to 300° C. for 1 hour to 5 hours.

7. The method of claim 1, wherein the primary heating and the secondary heating are performed in an inert gas atmosphere including argon (Ar).

8. The method of claim 1, wherein the metal glycolate solution comprises a single material selected from the group consisting of aluminum glycolate, zirconium glycolate, titanium glycolate, calcium glycolate, and manganese glycolate, or a mixture of two or more thereof.

9. The method of claim 1, wherein the lithium-containing transition metal oxide is selected from the group consisting of LiMO$_2$ (M=Co, Mn, Ni, Ni$_{1/3}$Co$_{1/3}$Mn$_{1/3}$, Cr, or V), LiMO$_4$ (M=CoMn, NiV, CoV, CoP, FeP, MnP, NiP, or Mn$_2$), Li(Ni$_a$Co$_b$Mn$_c$)O$_2$ (0<a<1, 0<b<1, 0<c<1, a+b+c=1), LiNi$_{1-y}$Co$_y$O$_2$, LiCo$_{1-y}$Mn$_y$O$_2$, LiNi$_{1-y}$Mn$_y$O$_2$ (0<y<1), Li(Ni$_a$Mn$_b$Co$_c$)O$_4$ (0<a<2, 0<b<2, 0<c<2, a+b+c=2), LiMn$_{2-z}$Ni$_z$O$_4$, LiMn$_{2-z}$Co$_z$O$_4$ (0<z<2), and LiV$_3$O$_6$.

10. The method of claim 9, wherein the lithium-containing transition metal oxide is LiCoO$_2$, LiNiO$_2$, LiMnO$_2$, LiCuO$_2$, LiMn$_2$O$_4$, LiNi$_{1/3}$Mn$_{1/3}$Co$_{1/3}$O$_2$, LiNi$_{0.6}$Mn$_{0.2}$Co$_{0.2}$O$_2$, LiCoPO$_4$, or LiFePO$_4$.

11. The method of claim 1, wherein the drying is performed in a temperature range of 100° C. to 200° C. for 1 hour to 4 hours.

12. The method of claim 1, wherein the heat treatment is performed in a temperature range of 200° C. to 1,200° C. for 1 hour to 3 hours.

13. A cathode active material manufactured by the method of claim 1, the cathode active material comprising:
lithium-containing transition metal oxide particles; and
a metal oxide layer coated on surfaces of the lithium-containing transition metal oxide particles.

14. The cathode active material of claim 13, wherein the metal oxide layer comprises at least one compound selected from the group consisting of metal organo-compounds represented by Chemical Formulae 1 to 3:

$$M(C_2H_5O_2)_n \qquad \text{[Chemical Formula 1]}$$

$$M(C_6H_{(8-n)}O_7) \qquad \text{[Chemical Formula 2]}$$

$$M(C_6H_{(8-n)}O_7)(C_2H_5O_2) \qquad \text{[Chemical Formula 3]}$$

(where M, as a metal desorbed from a metal precursor, represents at least one metal selected from the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Jr), nickel (Ni), zinc (Zn), aluminum (Al), gallium (Ga), indium (In), silicon (Si), germanium (Ge), tin (Sn), lanthanum (La), and cerium (Ce), and n is an integer between 1 and 4).

15. The cathode active material of claim 13, wherein a thickness of the metal oxide layer is in a range of 5 nm to 500 nm.

16. The cathode active material of claim 13, wherein an amount of metal in the metal oxide layer is in a range of 0.01 wt % to 10 wt % based on a total amount of the lithium-containing transition metal oxide.

17. A cathode for a secondary battery comprising:
a cathode collector; and
the cathode active material of claim 13 coated on the cathode collector.

18. A lithium secondary battery comprising:
the cathode of claim 17;
an anode;
a separator disposed between the cathode and the anode; and
a lithium salt-containing non-aqueous electrolyte solution.

* * * * *